(12) United States Patent
Sanchez et al.

(10) Patent No.: US 11,681,813 B2
(45) Date of Patent: Jun. 20, 2023

(54) SYSTEM AND METHOD FOR ENFORCING CONTEXT-BASED DATA TRANSFER AND ACCESS

(71) Applicant: Cisco Technology, Inc., San Jose, CA (US)

(72) Inventors: Marcelo Yannuzzi Sanchez, Canton de Fribourg (CH); Carlos M. Pignataro, Cary, NC (US); Robert Edgar Barton, BC (CA); Simon Dyke, Lyndhurst (GB)

(73) Assignee: Cisco Technology, Inc., San Jose, CA (US)

( * ) Notice: Subject to any disclaimer, the term of this patent is extended or adjusted under 35 U.S.C. 154(b) by 484 days.

(21) Appl. No.: 16/743,645

(22) Filed: Jan. 15, 2020

(65) Prior Publication Data

US 2020/0364351 A1 Nov. 19, 2020

Related U.S. Application Data

(60) Provisional application No. 62/847,226, filed on May 13, 2019.

(51) Int. Cl.
*G06F 21/60* (2013.01)
*G06F 3/06* (2006.01)
(Continued)

(52) U.S. Cl.
CPC ............ *G06F 21/602* (2013.01); *G06F 3/064* (2013.01); *G06F 3/0622* (2013.01);
(Continued)

(58) Field of Classification Search
CPC .. G06F 21/602; G06F 21/6218; G06F 3/0622; G06F 3/0637; G06F 3/064; G06F 3/0659; G06F 3/0673; H04L 9/3271
See application file for complete search history.

(56) References Cited

U.S. PATENT DOCUMENTS 8,874,528 B1 * 10/2014 Banerjee ............... G06F 16/217
707/694
9,330,275 B1 * 5/2016 Endresen ............ G06F 21/6218
(Continued)

OTHER PUBLICATIONS

Herbster et al., "Privacy Capsules: Preventing Information Leaks by Mobile Apps," ACM Digital Library, Jun. 20, 2016, pp. 1-13.

*Primary Examiner* — Vance M Little
(74) *Attorney, Agent, or Firm* — Polsinelli

(57) ABSTRACT

Systems, methods, and computer-readable media for context-based transfer and access of data include a producer which receives a request from a consumer to access a data block. The producer verifies whether a context associated with the consumer will allow access the data block, by providing a challenge to the consumer and obtaining a response, the response including a certification that the context associated with the consumer will allow the consumer to access the data block. Upon verifying that the context allows the consumer to access the data block, the producer transfers a data capsule, the data capsule including an encrypted version of the data block and a micro agent for monitoring access to the data block. The micro agent can interact with an operating system at the consumer to allow decryption and local access of the data block upon the data capsule being transferred.

20 Claims, 10 Drawing Sheets

(51) Int. Cl.
*H04L 9/32* (2006.01)
*G06F 21/62* (2013.01)

(52) U.S. Cl.
CPC .......... *G06F 3/0637* (2013.01); *G06F 3/0659* (2013.01); *G06F 3/0673* (2013.01); *G06F 21/6218* (2013.01); *H04L 9/3271* (2013.01)

(56) References Cited

U.S. PATENT DOCUMENTS

| | | | |
|---|---|---|---|
| 9,654,922 B2 | 5/2017 | Ronca | |
| 10,116,697 B2 | 10/2018 | Beckman et al. | |
| 10,257,197 B2 | 4/2019 | White et al. | |
| 10,437,864 B2 | 10/2019 | Jones | |
| 2006/0010227 A1* | 1/2006 | Atluri | H04L 67/1095 709/217 |
| 2007/0050362 A1* | 3/2007 | Low | G06F 21/6245 |
| 2007/0130070 A1* | 6/2007 | Williams | G06Q 30/0601 705/50 |
| 2008/0215897 A1* | 9/2008 | Doyle | H04L 9/0833 713/193 |
| 2009/0094164 A1* | 4/2009 | Fontaine | H04L 63/107 705/67 |
| 2010/0130233 A1* | 5/2010 | Parker | H04L 67/18 455/456.3 |
| 2012/0195597 A1* | 8/2012 | Malaney | H04W 12/10 398/115 |
| 2013/0145178 A1* | 6/2013 | Jeffries | G06F 21/6209 713/193 |
| 2016/0224970 A1* | 8/2016 | Pama | G06Q 20/425 |
| 2018/0020001 A1* | 1/2018 | White | H04L 63/0428 |

* cited by examiner

SYSTEM AND METHOD FOR ENFORCING CONTEXT-BASED DATA TRANSFER AND ACCESS

CROSS-REFERENCES TO RELATED APPLICATIONS

This application claims the benefit of U.S. Provisional Application No. 62/847,226, filed May 13, 2019, which is hereby incorporated by reference, in its entirety and for all purposes.

TECHNICAL FIELD

The subject matter of this disclosure relates in general to the field of enforcing context-based transfer, storage, and access of data. More specifically, example aspects are directed to the use of data capsules with self-executing micro agents for enforcing data geofencing.

BACKGROUND

Data geofencing includes defining and enforcing perimeters on data for various data functions including transfer, storage, and access. In many contexts data is a valuable virtual asset, and so protecting access to the data is an important goal. For various privacy, security, financial, political, economic, and/or other purposes, data access may need to be precisely and reliably controlled. However, effective data geofencing remains a problem in the industry. For example, companies and administrations lack effective mechanisms to ensure that data remains inside the country or even within a given administrative domain. In addition, questions such as how to make compliance with geofencing restrictions auditable are frequently debated, especially, after the adoption of regulations and laws such as General Data Protection Regulation (GDPR) in Europe.

Existing efforts for data geofencing face some limitations. For instance, some systems may base geofencing decisions on source internet protocol (IP) addresses associated with the data. However, such approaches do not overcome challenges created by Virtual Private Network (VPN) or other services which can bypass source IP address restrictions. Public Key Infrastructure (PKI) & Route Origin Authorization can be used to bond to an Autonomous System (AS), but an AS can have a footprint beyond the limits of a country. The utilization of reverse Domain Name Server (DNS) lookups is another approach, but domains are not tightly bound to territorial limits. Systems such as Locator/ID Separation Protocol (LISP) can be used in other alternatives, but LISP was not devised to add strict geolocation based constraints. Accordingly, there is an existing need for improved data geofencing solutions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
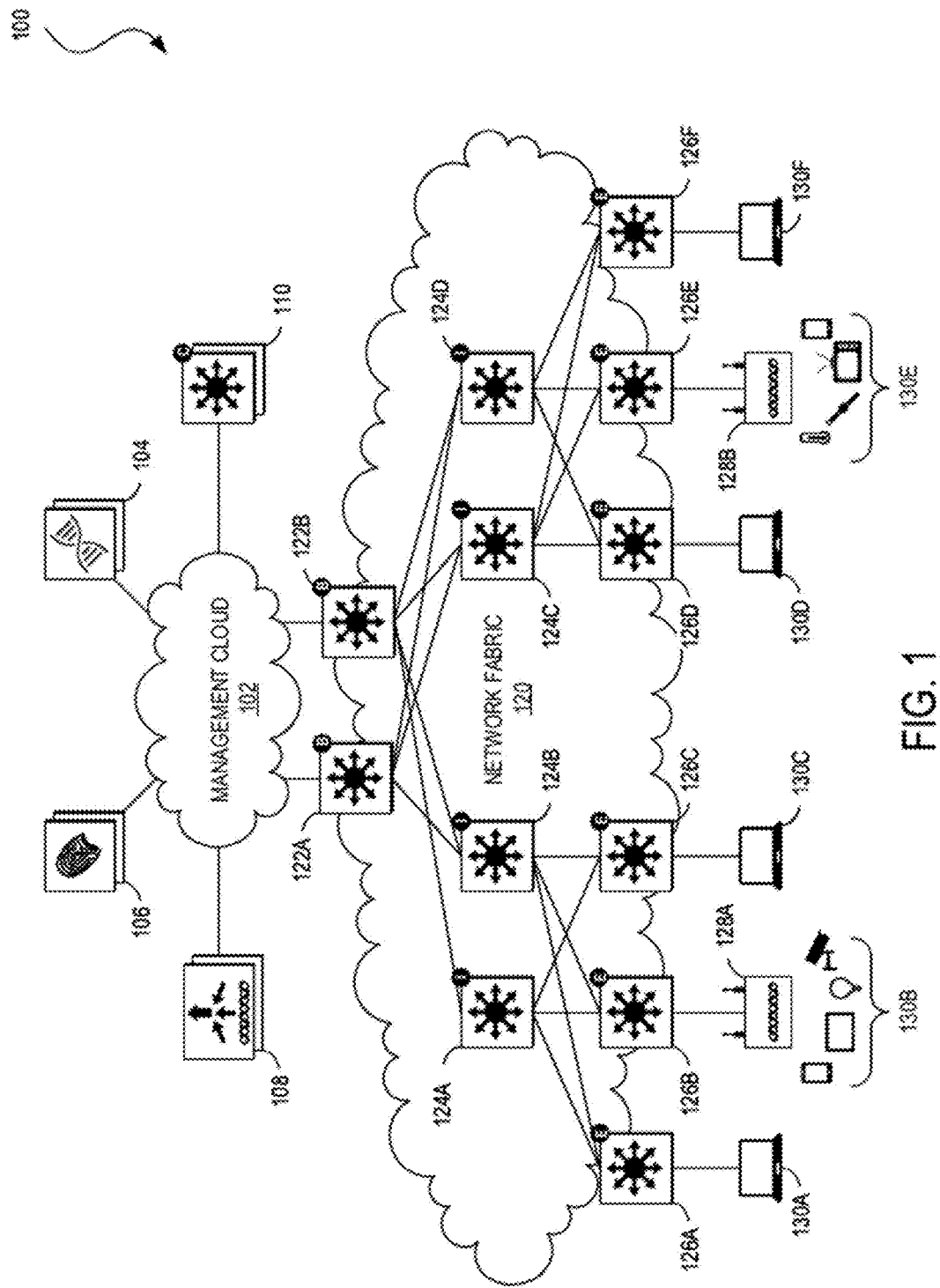
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously mentioned, there is a need for improved solutions to address the challenges in geofencing data. In example aspects of this disclosure, an active and atomic unit of data (referred to as a data capsule) is disclosed. The data capsule has functionality for understanding whether it can be transferred to a destination host based on context such as the geolocation of the destination host. The transfer of the data capsule to the destination host is subject to the destination host being able to prove that the destination host is within an approved context which would allow the destination host to read the data blocks. In some examples, the context includes a geolocation of the destination host. In some examples, trusted third parties may be employed to prove or certify the destination host's geolocation.

In some examples, the data capsule can be configured as a container that includes a data block which is encrypted. The data capsule also includes a self-executable micro agent that can record the state of the data capsule, as well as determine whether the data capsule is being accessed in an acceptable context (e.g., is the capsule still within a jurisdiction in which the data can be accessed). The micro agent can include a functional block or software module which can be programmed to be self-executable and configured to record state, control access to the data block, and other related functions.

In some examples, the data capsule contains data blocks which are encrypted before being transferred to an approved or authenticated destination host. The transfer may be further subject to any applicable data sharing policies for the specific data blocks. Upon being transferred to the destination host, the data blocks remain encrypted. The data capsule with the encrypted data blocks may be stored in a memory of the destination host. The micro agent may log every access to the data blocks. For example, access to the data is always logged by the micro agent (i.e., every attempt to read or write the data block modifies the state of the micro agent). The micro agent remains encapsulated in the data capsule along with an immutable data ID associated with the data blocks.

To enforce geofencing, any access (e.g., read, write, or execute) to the data blocks in the memory of the destination host is subject to the destination host being able to prove its geolocation (or other aspects pertaining to context as defined by a configurable access policy determined by the micro agent) at the time of the access. An operating system (OS) of the destination host may be configured to enable decryption of the data blocks if the destination host is in an approved geolocation, for example In some cases, in addition to the destination host being able to prove its location, a process desiring access to the data blocks may also be required to prove its location before being able to gain access to the data blocks.

In some cases, for example, when the data block is large and may consume significant transfer time, Continuous Geolocation Assessment (CGA) techniques may be used to monitor the remote consumer's location proof at several points in time during the transfer to ensure that the remote consumer continues to be able to prove its location.

Disclosed herein are systems, methods, and computer-readable media for the creation and use of the data capsules for context-based access of data. In some examples, a data capsule is created at a data transfer source, where the data capsule includes an encrypted data block and a self-executable micro agent. The micro agent is configured to determine whether a request to access to the encrypted data block by a destination host is allowable based at least on context related to the destination host. The data capsule can be transmitted to the destination host if access to the encrypted data block by the destination host is determined to be allowable. Upon transfer, the destination host may be allowed to access the encrypted data block based on context-based validation by the micro agent of whether the destination host has permission to decrypt and access the encrypted data block.

For example, the disclosed systems, methods, and computer-readable media for controlling context-based transfer and access of data include a producer which receives a request to access a data block from a consumer. The producer can verify whether a context associated with the consumer will allow the consumer to access the data block, by providing a challenge to the consumer and obtaining a response to the challenge, the response including a certification that the context associated with the consumer will allow the consumer to access the data block. Upon verifying that the context allows the consumer to access the data block, the producer can transfer a data capsule, the data capsule including an encrypted version of the data block and a micro agent for monitoring access to the data block. The micro agent can interact with an operating system at the consumer to allow decryption and local access of the data block upon the data capsule being transferred.

In some examples, a method for controlling context-based access of data is provided. The method includes receiving, at a producer, a request to access a data block from a consumer; verifying whether a context associated with the consumer will allow the consumer to access the data block; and upon verifying that the context allows the consumer to access the data block, transferring a data capsule, the data capsule comprising an encrypted version of the data block and a micro agent for monitoring access to the data block.

In some examples, a system for controlling context-based access of data is provided. The system, comprises one or more processors; and a non-transitory computer-readable storage medium containing instructions which, when executed on the one or more processors, cause the one or more processors to perform operations including: receiving, at a producer, a request to access a data block from a consumer; verifying whether a context associated with the consumer will allow the consumer to access the data block; and upon verifying that the context allows the consumer to access the data block, transferring a data capsule, the data capsule comprising an encrypted version of the data block and a micro agent for monitoring access to the data block.

In some examples, a non-transitory machine-readable storage medium is provided, including instructions configured to cause a data processing apparatus to perform operations for controlling context-based access of data, the operations including receiving, at a producer, a request to access a data block from a consumer; verifying whether a context associated with the consumer will allow the consumer to access the data block; and upon verifying that the context allows the consumer to access the data block, transferring a data capsule, the data capsule comprising an encrypted version of the data block and a micro agent for monitoring access to the data block.

In some examples of the methods, systems, and non-transitory machine-readable storage media, verifying whether a context associated with the consumer will allow the consumer to access the data block comprises: providing a challenge to the consumer, the challenge associated with the request; and obtaining a response to the challenge, the response comprising at least a certification that the context associated with the consumer will allow the consumer to access the data block.

In some examples of the methods, systems, and non-transitory machine-readable storage media, the certification comprises a trusted third party certification and one or more parameters for proving that the trusted third party certification is associated with the request from the consumer to access the data block.

Some examples of the methods, systems, and non-transitory machine-readable storage media, further comprise receiving the request from a data broker and transferring the data capsule to the data broker, the data broker configured as an intermediary between the producer and the consumer.

In some examples of the methods, systems, and non-transitory machine-readable storage media, the micro agent comprises a self-executable macro for maintaining a log of all read and write accesses to the data block.

In some examples of the methods, systems, and non-transitory machine-readable storage media, the micro agent is configured to control access to the data block by one or more applications when the data block is received by the consumer, based on interacting with an operating system.

In some examples of the methods, systems, and non-transitory machine-readable storage media, the data capsule further comprises a data block identifier associated with the data block, the data block identifier for identifying the data block.

In some examples of the methods, systems, and non-transitory machine-readable storage media, the context is a geolocation associated with the consumer.

Some examples of the methods, systems, and non-transitory machine-readable storage media, further comprise performing continuous geolocation assessment while transferring the data capsule, the continuous geolocation assessment for verifying the geolocation of the consumer at two or more points in time during the transfer This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DESCRIPTION OF EXAMPLE EMBODIMENTS

Disclosed herein are systems, methods, and computer-readable media for context-based enforcement of data access. In some examples, an active and atomic unit of data (referred to as a data capsule) is disclosed. The data capsule has functionality for understanding whether it can be transferred to a destination host based on context such as the geolocation of the destination host. The transfer of the data capsule to the destination host is subject to the destination host being able to prove that the destination host is within an approved context which would allow the destination host to read the data blocks. In some examples, the context includes a geolocation of the destination host. In some examples, trusted third parties may be employed to prove or certify the destination host's geolocation.

FIG. 1 illustrates an example of a physical topology of a network 100 which may be configured according to aspects of this disclosure. For example, the network 100 can provide an infrastructure for transferring data capsules, performing third party verifications, transferring certificates, and other control and transport functions according to disclosed aspects. In one example, the network 100 may provide intent-based networking in an enterprise network. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The endpoints or network devices can be spread apart geographically and cover many domains which can have their own context-based data access rules and requirements. The illustrations and examples provided herein are for clarity and simplicity.

In this example, the network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128A and 128B (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. In some examples, the endpoints 130 can include various Internet-connected devices which can be deployed in the computing devices. For example, the endpoints 130 can include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow. In some examples, a logical architecture for the network 100 can be implemented to include functions related to management, control, network fabric, physical layer, and shared services for the network 100.

Figure 2:
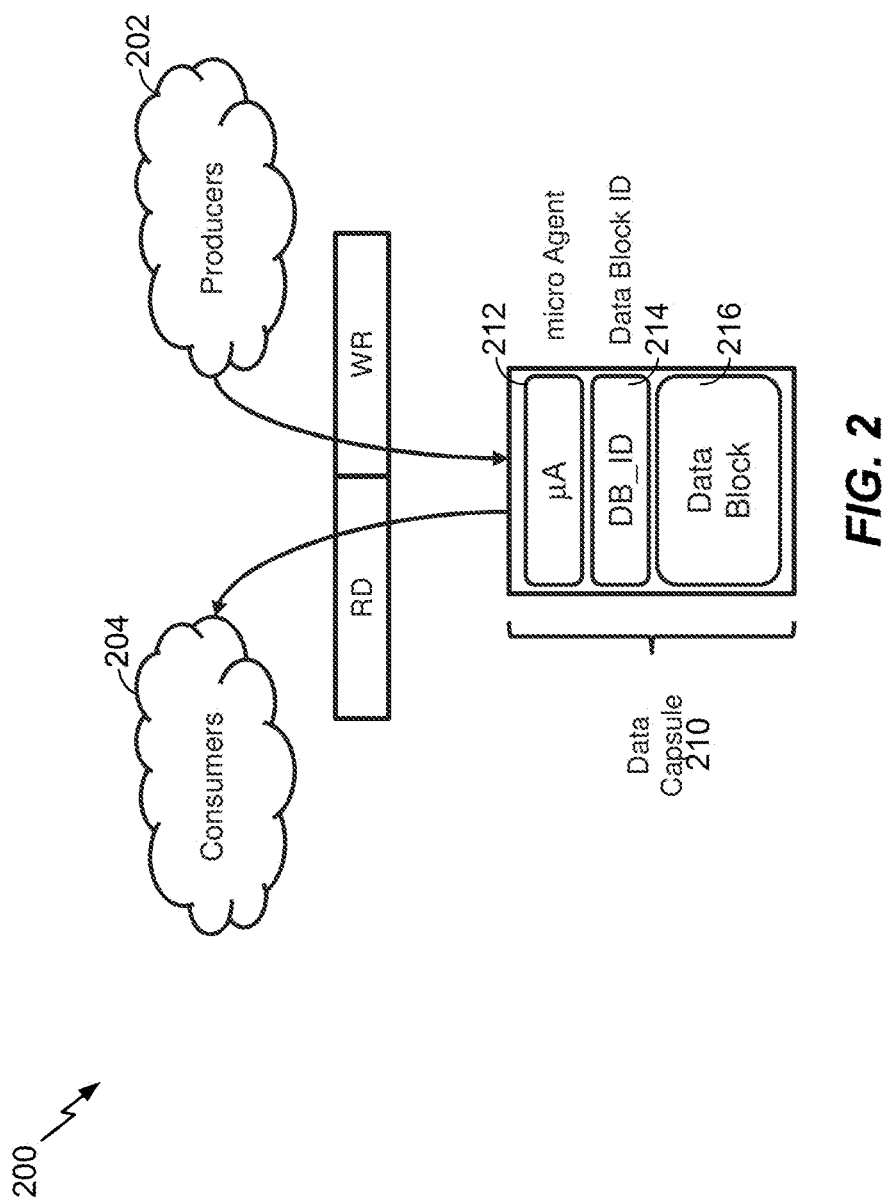
FIG. 2 illustrates a network which can support context-based verification and transfer of data capsules, in accordance with some examples.

FIG. 2 illustrates an example network 200 which may be configured to support data capsules according to aspects of this disclosure. In some aspects, the network 200 can be implemented using the network fabric, management, and/or architecture described with reference to the network 100 of FIG. 1. In some examples, the network 200 can include or support one or more producers 202 which originate data traffic and/or one or more consumers 204 of the data traffic (the producers 202 and the consumers 204 need not be separate entities but the same entity may act as both a producer and a consumer based on specific data traffic patterns).

A data capsule 210 according to this disclosure includes a micro agent 212 (also referred to as "µA"), a data block 216, and a unique identifier of the data block, data block ID 214 (also referred to as "DB_ID"). One or more producers 202 can generate, transfer, or write (WR) the data capsule 210, and one or more consumers 204 can consume or read (RD) the data capsule 210. The writing or transfer, as well as the reading of the data capsule 210 can be based on several rules, verification procedures, and protocols to enforce context-aware access of the data capsule 210.

Any transfers of the data capsule 210 can be subject on data sharing policies. These policies can be implemented on a segment or block wise basis. For example, the data block 216 can have its own specific data sharing policy which can differ from the data sharing policies for other data blocks which may be in other data capsules.

Context-based enforcement of data access can be explained with reference to geolocation being considered as an example context. For data blocks that are subject to geolocation constraints, the data blocks can be encapsulated and transferred in the form of the data capsule 210. As shown in FIG. 2, when the data capsule 210 is transferred or read, the micro agent 212 can be transferred along with the data block 216. The micro agent 212 and the data block ID 214 remain unmodified within the data capsule 210.

Further, the micro agent 212 and the data block ID 214 are configured to be traceable. For example, any access to the data block 216 can be logged by the micro agent 212. For example, any attempt to read or write the data block 216 can update the state of the micro agent 212, where the state changes in terms of read or write attempts can be preserved. This provides accountability and a traceable history for the data block 216.

The data block 216 can also be encrypted prior to being transferred. Any suitable encryption technique can be used, such as Advanced Encryption Standard (AES), Rivest-Shamir-Adleman (RSA), Triple Data Encryption Algorithm (3DEA) or Triple Data Encryption Standard (3DES), Secure Shell (SSH), or other. The data block 216 can remain encrypted after being transferred to a destination host (e.g., located in one or more consumers 204). Context-based access, such as geofencing can be enforced by requiring a proof of source in the form of a verifiable claim. For example, the destination host or consumer 204 may be required to prove that the destination host is present within an approved geographical region, such as prove that the consumer 204 is in an approved country.

Figure 3:
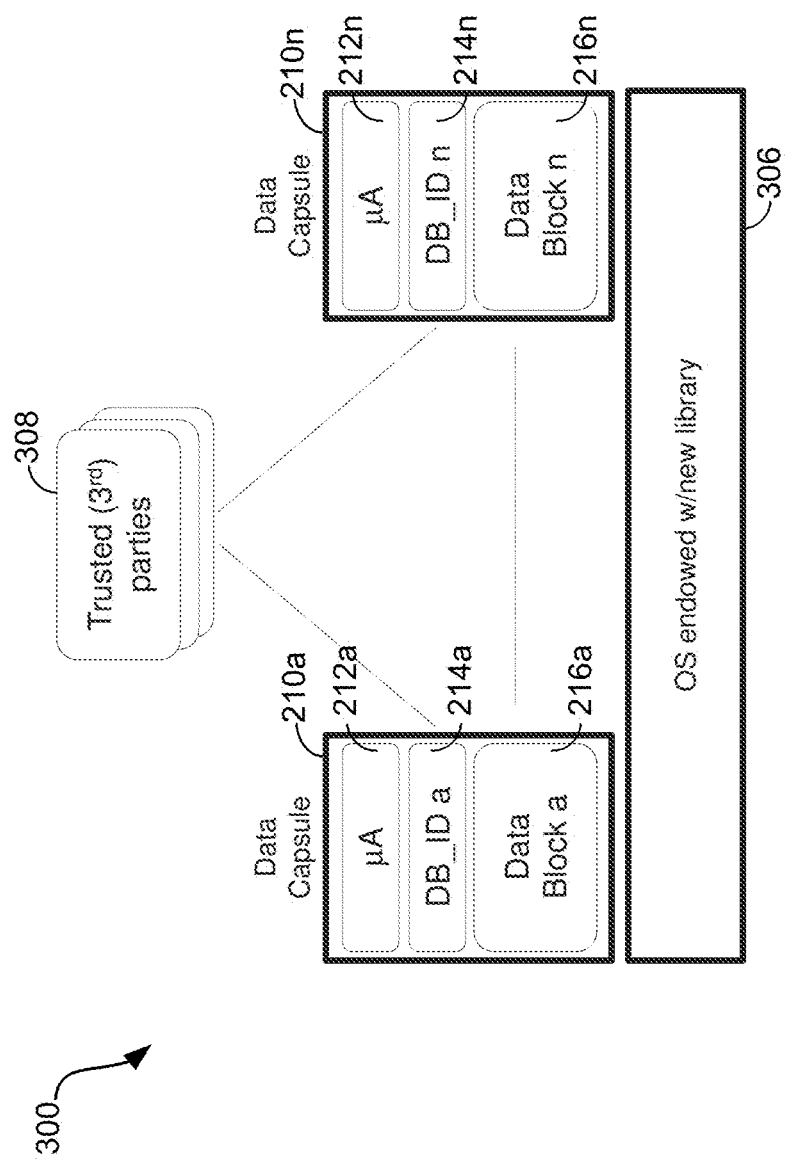
FIG. 3 illustrates a system for context-based verification and transfer of data capsules, in accordance with some examples.

FIG. 3 illustrates a block diagram of a system 300 which can be used for proving context. System 300 can support functions related to one or more data capsules such as the data capsule 210 of FIG. 2. In some examples, functions related to creating, manipulating, transferring and deleting the data capsules can use one or more trusted third parties and an operating system (OS) library.

In more detail, one or more trusted third parties 308 can communicate with one or more data capsules 210a-n (each with a respective micro agent 212a-n, DB_ID 214a-n, and data blocks 216a-n). The data capsules 210a-n can be created, manipulated, deleted, etc., using an OS 306 which is endowed with a library for supporting these functions. In some examples, the OS 306 provides a platform for discovering whether a consumer 204 or producer 202 has a valid OS library compatible with the OS 306. The OS 306 can include an identifier or one or more authentication techniques to detect with the OS of a remote consumer/producer is compatible with the OS 306. The OS 306 can also include support for modifying or updating a state associated with the micro agent of each of the data capsules 210a-n based on any read or write attempts to their respective data blocks 216a-n.

The trusted third parties 308 can provide location verification for the data capsules 210a-n. In some examples, the trusted third parties 302 can include functionality for binding locations with data block IDs 214a-n of the data capsules 210a-n. The combination of the location and IDs can prove verifiable claims for the location of the data blocks, in combination with the verification provided by the OS 306. In some examples, the location and ID based verification provided by the system 300 can be compatible with current or future generations of Locator ID Separation Protocol (LISP), Hybrid Information-Centric Networking (hICN), or others.

Figure 4A:
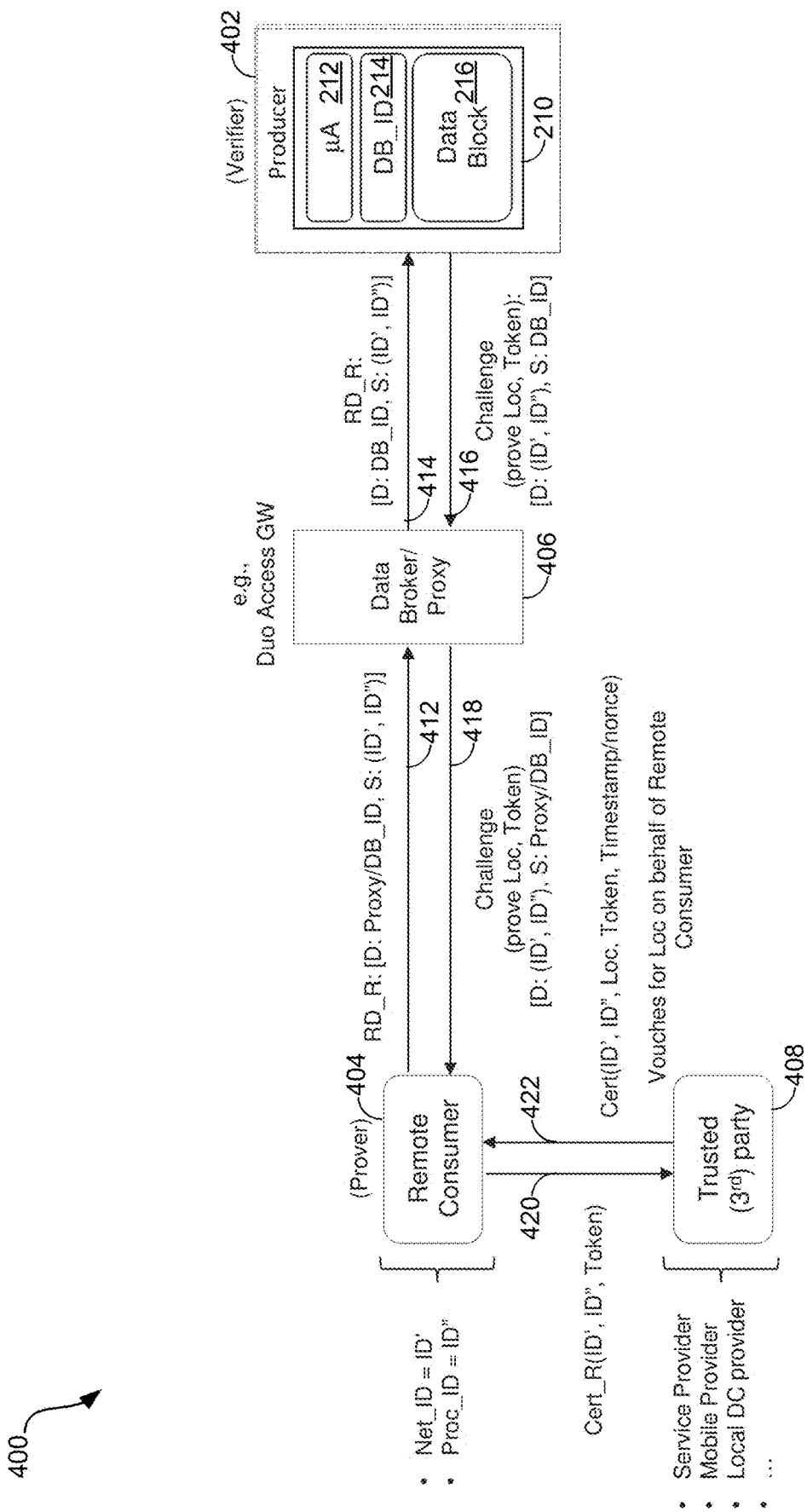
FIGS. 4A-B illustrate systems and associated processes for verifying context associated with data access, in accordance with some examples.
Figure 4B:
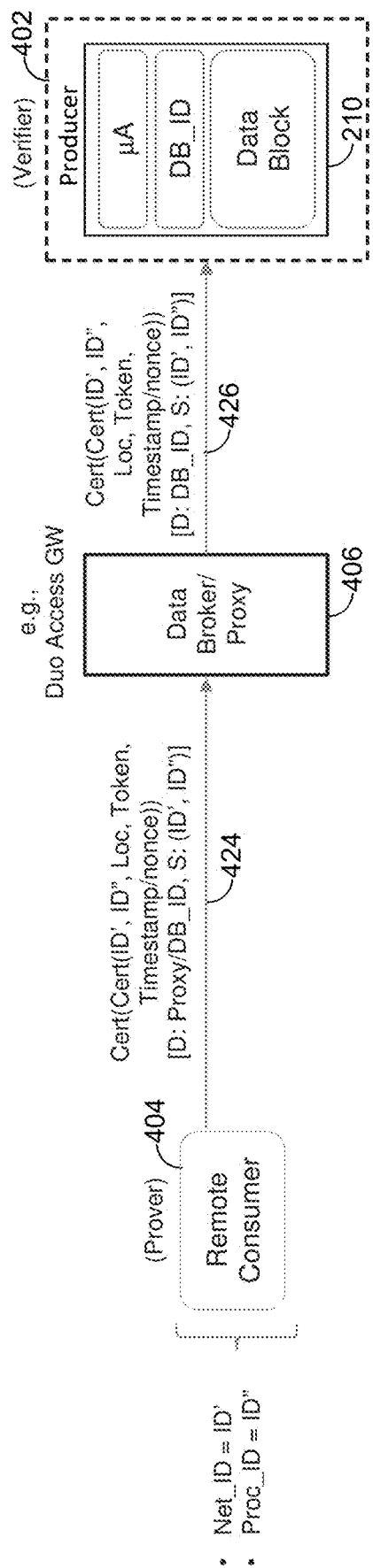

FIGS. 4A-B illustrate aspects of a system 400 and associated processes for verifying location/context using trusted third parties. The system 400 can include a producer 402 of a data capsule such as the data capsule 210. The producer 402 is identified as a verifier in the illustrated example. The producer 402 can be configured to verify that a remote consumer such as the consumer 404 can prove its context before transferring the data capsule 210 to the remote. Correspondingly in this example, the consumer 404 can be configured as a prover.

A data broker 406 is provided to facilitate transactions for proving and verifying the location/context for the producer 402 and the consumer 404 as noted above. The data broker 406 can include a proxy or other data sharing policy already in place to access data from a set of authorized locations. In some examples, the data broker 406 can be configured as a Cisco Duo access gateway which both the consumer 404 and the producer 402 can access. Additionally, a trusted third party 408 can be used for authenticating the context such as the geolocation of the consumer 404. A process for proving the geolocation of the consumer 404 is described in FIGS. 4A-B in the steps 412 to 426 below.

To facilitate with proving its geolocation, the consumer 404 can include associated one or more identifiers (IDs) such as a Net_ID, which represents a globally routable ID, and a Proc_ID which represents the ID of a local process running on the consumer 404 that will consume the data block with a particular DB_ID, where the data block with the DB_ID is encapsulated in the data block 210.

Referring first to FIG. 4A, at the step 412, the consumer 404 can provide a read request (RD_R) which includes the data broker 406 and the DB_ID as its destination (D: Proxy/DB_ID) and an address of the consumer 404 as a source (S). The (ID', ID") shown in the read request includes a tuple which can bind the global Net_ID (ID') and a local Proc_ID (ID") at the remote consumer 404. The tuple allows the consumer 404 to verify (prove) that the process requesting the RD, with the Net_ID ID' is bound to the Proc_ID ID".

At the step 414, the read request (RD_R) is forwarded from the data broker 406 to the producer 402. Upon receiving the read request, the producer 402, acting as a verifier, can issue a challenge in the step 416. The challenge can include a request to the requesting consumer to prove its location, as well as a token which is associated with the received read request and its tuple. The challenge can be received at the broker 406 and in the step 418 the challenge is forwarded to the consumer 404.

At the step 420, the consumer sends a certificate request (Cert_R) to the trusted third party 408 to provide a verifiable claim that the consumer has the approved context for reading the data block identified by the tuple. The certificate request includes the tuple as well as the token obtained from the challenge. In various examples, the trusted third party 408 can include a third party which can vouch for the location of the consumer 404.

For example, the trusted third party 408 can include an internet service provider (ISP), a mobile provider, local provider, a base station for a cellular connection, etc., which can authenticate that particular users such as the consumer 404 are within the approved location. In some examples, the trusted third party 408 can include a current or future generation of the LISP, an hICN based system, or other. Remote attestation, probing, monitoring traffic, or other technique can be used by the trusted third party 408 to verify the location of the requesting consumer 404. The trusted third party 408 can use any other technique to prevent a situation where the trusted third party 408 may vouch for the consumer 404 under IP prefix hijacking or other attack which could be present in a Border Gateway Protocol (BGP), for example. At the step 422, the trusted third party 408 provides a certificate verifying the location of the consumer 404. The certificate can include the tuple, the verified location, the received token, as well as a timestamp and/or nonce for assuring freshness of the certificate.

Referring now to FIG. 4B, the process implemented by the system 400 continues to the step 424 where the consumer 404 forwards the received certificate, along with the information from the original read request to the data broker 406. The data broker 406 then forwards the certificate to the producer 402 at the step 426. This way the consumer 404 is able to provide a verifiable certificate which proves its approved location or origin of the read request for the data capsule 210. In some examples, the micro agent of the data capsule 210 in the producer 402 can modify or update its status upon receiving the verifiable certificate for the read request.

Figure 5:
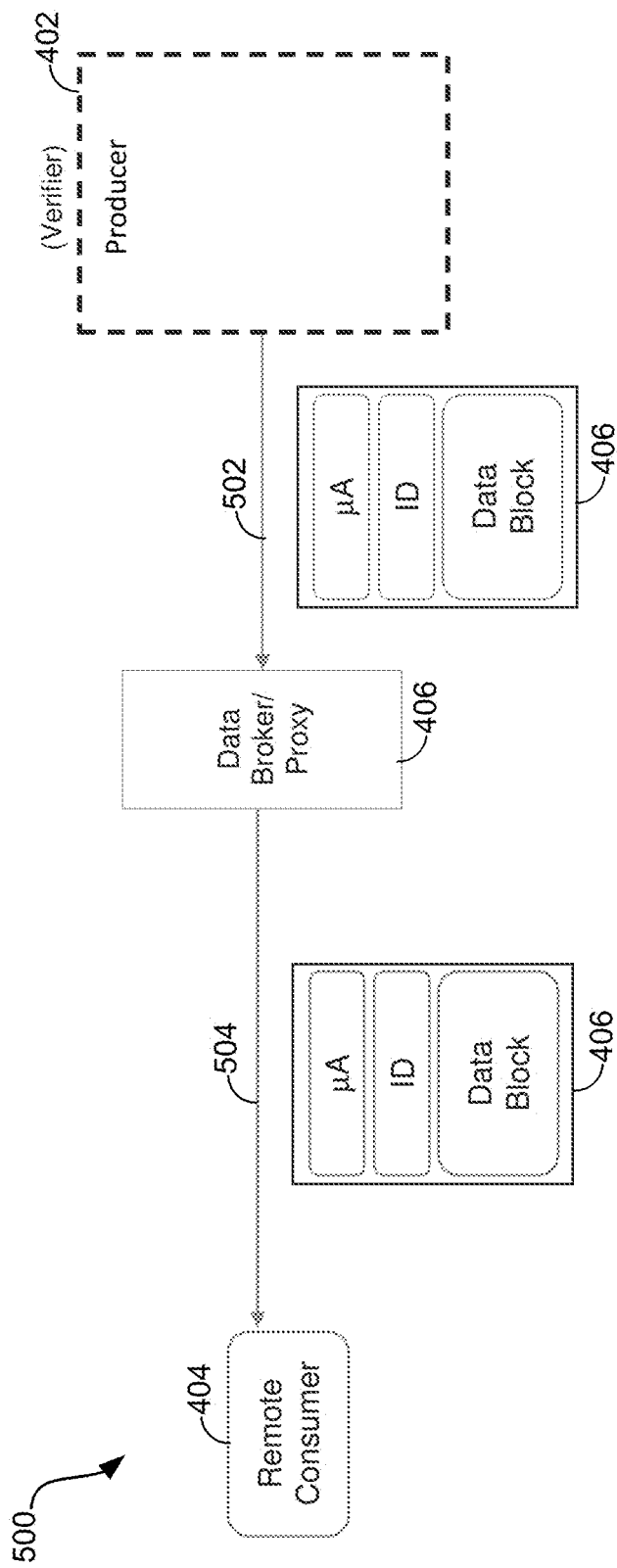
FIG. 5 illustrates systems and associated processes for transferring data capsules subject to context-based verification, in accordance with some examples.

FIG. 5 illustrates a system 500 and associated processes for transferring data to a verified consumer. In some examples, the system 500 can be similar to the system 400 and may be implemented to verify a consumer's location using the processes discussed with reference to FIGS. 4A-B prior to transferring the data capsule 210. For example, at the step 502, the producer 402, upon receiving the certificate in the step 426 or upon verifying a read request from a consumer by any other means, can transfer the data capsule 210 to the data broker 406. The data broker 406 can forward the data capsule 210 to the requesting consumer 404 of proven origin at the step 504.

It will be appreciated that the data block included in the data capsule 210 can be of a large size. For example, transferring the data capsule 210 in the steps 502-504 may not be instantaneous but may involve several transfer cycles or extend over a duration of time in practical implementations. In examples where the data block is large and may consume significant transfer time, Continuous Geolocation Assessment (CGA) techniques may be used to monitor the location proof of the consumer 404 at several points in time during the transfer in the steps 502-504 to ensure that the remote consumer 404 continues to be able to prove its location. For example, more than one sequence of challenge and/or certification processes discussed in the steps 416-426 can be employed in the midst of one or more of the steps 502-504 to periodically verify location while the data block continues to be transferred. Various other such CGA techniques can be employed to ensure, for example, that the data capsule 210 is not transferred to a trusted consumer 404 which moves to an untrusted or non-approved geolocation upon initiating a read request and prior to receiving the data capsule 210.

Figure 6:
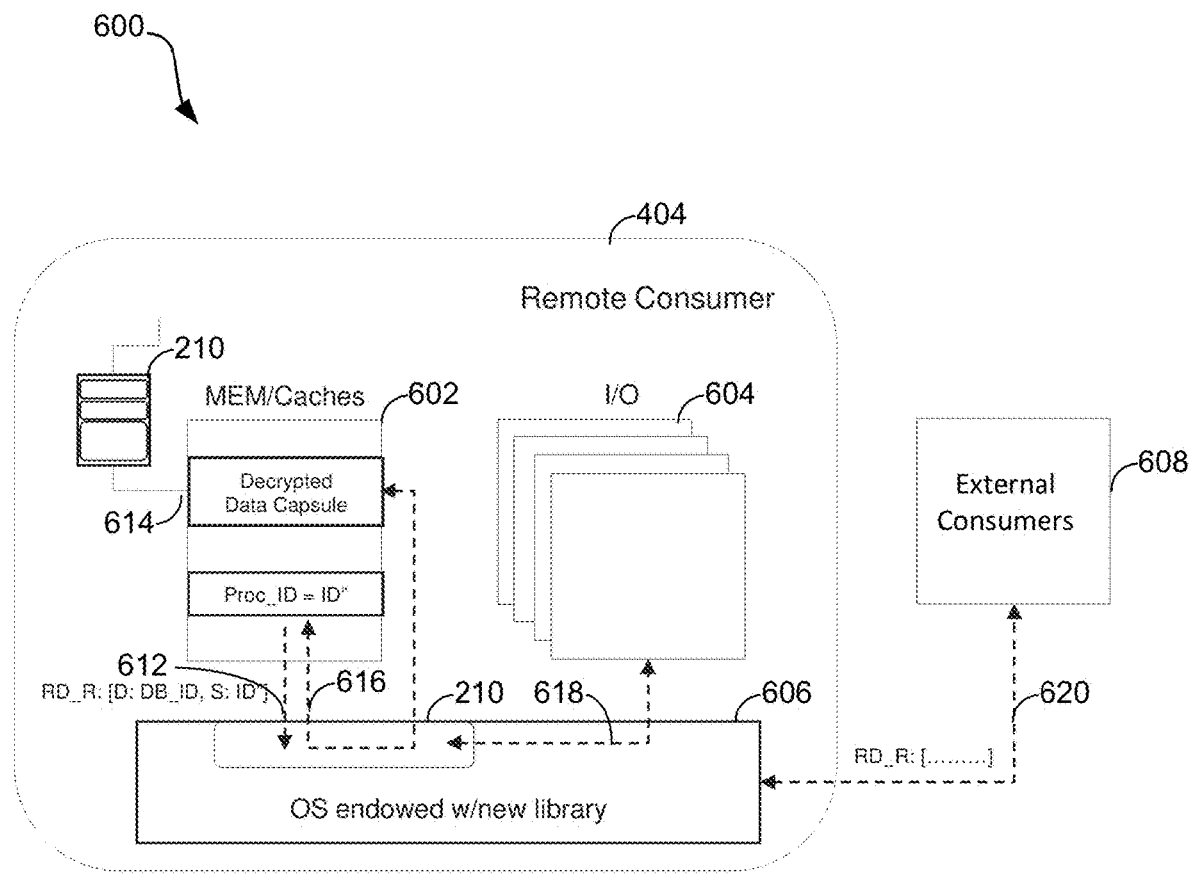
FIG. 6 illustrates systems and associated processes for local access of data capsules, in accordance with some examples.

FIG. 6 illustrates a system 600 and associated processes for reading a data capsule locally at a location. For example, the data capsule 210 may have been transferred to the consumer 404 using one or more of the steps described with reference to the system 400 of FIGS. 4A-B and the system 500 of FIG. 5. The consumer 404 may have proved its origin or approved geolocation prior to the data transfer. However, upon obtaining the data capsule 210 from the producer 402 and having stored the data capsule 210 locally at the consumer 404, one or more additional checks and procedures can be employed for allowing the consumer 404 to locally access the data block in the data capsule 210. The local access can include a read, write, execute, etc.

The consumer 404 can include one or more functional blocks such as one or more memory or caches 602, one or more input/output device 604, and one or more other processors or other functional blocks which have not been specifically illustrated. In some examples, when the data capsule 210 is received, it can be placed in a local memory which is controlled by the OS 606. Similar to the OS 306 discussed with reference to FIG. 3, the OS 606 may be endowed with a library configured according to protocols such as LISP for supporting the context-based enforcement of access to data in the data capsule 210.

At the step 612, the process with the process ID (Proc_ID=ID") which had requested access to the data block in the data block 210 may initiate a local read request (RD_R) which can specify the data block ID DB_ID and the process ID ID".

The OS 306 can include a library which holds the certificate with the combination of the IDs, location, token, timestamp/nonce, etc., which had resulted in the transfer of the data capsule 210 in the steps 502-504. At the step 614, the data capsule can be decrypted (using a decryption mechanism corresponding to the previously described encryption mechanism which was used to encrypt the data block). The micro agent of the data capsule 210 can communicate with the OS 606 to allow the data capsule to be decrypted and accessed locally.

The decrypted data capsule can be stored and accessed in a memory/cache 602 in the step 616. In some examples, one or more processes through various I/O devices/mechanisms 604 can be allowed to access the decrypted data capsule 602 in the step 618. These I/O mechanisms 604 can be subsequently approved or authorized based on the same authorization provided to the consumer 404 based on context or geolocation. In some examples, in the step 620, other external consumers whose geolocation/context may not be similarly tied to that of the consumer 404 are prevented access to the data capsule. For example, the read request from the external consumers 608 outside the consumer 404 can be denied in the step 620.

Accordingly, aspects of this disclosure are directed to systems and methods for context-based enforcement of data transfer and access. For example, the disclosed aspects can be used for controlling data transfers throughout a network and for granting or denying access depending on the geolocation of the consumer. In some examples, systems and techniques can be implemented to reapprove or reauthorize access of a read request (step 612) based on the same authorization provided to the consumer 404 based on context or geolocation.

For example, reapproving or reauthorizing access to a previously authorized read request in the step 612 can protect against potential attacks such as when the remote consumer 404 may move to an unapproved location while holding a valid certificate (received in the step 424) to decrypt or unencrypt the data capsule. For instance, the remote consumer 404 can attempt to open the data capsule after a significant lapse of time (e.g., several days) after the data capsule was transferred and received by the remote consumer 404. Since the original authorization upon initial receipt may have become stale by this time, reasserting location during the first RD request in the step 612, i.e., even before the data capsule is decrypted can protect against possible security/permission lapses during the period of time when the initial authorization may have become stale. In some examples, the micro agent 212 can send a challenge to the local library of the OS 606 and request an updated certification before the data block can be decrypted. In this way, incorporating additional checks, challenges, or other security measures for reauthorization can protect against security/authorization lapses both before and after the data block has been transferred to the remote consumer 404. In some examples, a first challenge implemented by the data capsule or micro agent can provide validation that the data block can be transferred to an approved location (or context or geolocation). A subsequent second challenge can validate that the data block remains at an approved location (or context or geolocation).

In some examples, the disclosed techniques can be used for enforcing compliance with location based regulations, for example. In some examples, additional processes can be employed for cold boot attacks or other types of system attacks on a remote consumer to perform a memory dump and retrieve locally stored contents which can include the transferred data capsules. In some examples, systems and techniques can be implemented to erase all the data capsules managed by the OS 606 if any attempts to uninstall the OS 606 or such attacks are detected. In some examples, access to the data from the external consumers 608 can be denied while allowing access to internal I/O mechanisms 604 or other processes. Various suitable alternatives are also possible based on particular implementation needs.

Figure 7:
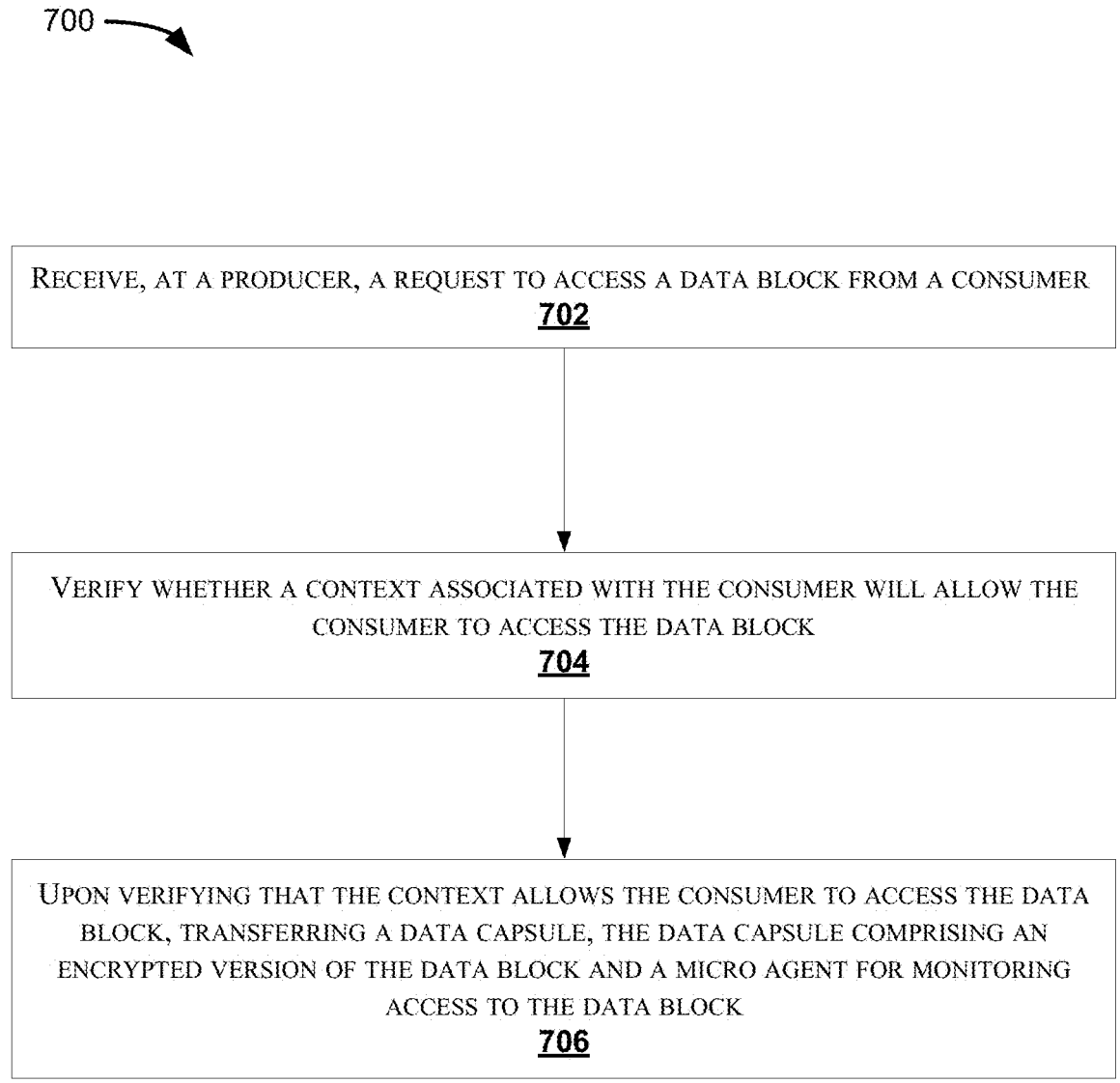
FIG. 7 illustrates a flow-chart for a process of context-based data transfer, in accordance with some examples.

FIG. 7 illustrates a process 700 for controlling context-based access of data. For example, the process 500 can be implemented in the network 200 which includes one or more producers and one or more consumers of data. In various examples, the process 700 can be implemented using the systems 400-600 and associated steps discussed with reference to FIGS. 4A-B, 5, and 6 above.

At step 702, the process 700 can include receiving, at a producer, a request to access a data block from a consumer. For example, the producer 402 can receive a request (e.g., the RD_R in steps 412-414) to access the data block 216. The request can be received from the remote consumer 404, forwarded by the data broker 406 acting as an intermediary between the producer 402 and the consumer 404. The request can specify whether it is a read or a write, have an associated address of the data broker 406, identifications of the consumer 404, an identifier associated with a process in the consumer which intends to access the data block, an identifier of the data block, and other information.

At step 704, the process 700 can include verifying whether a context associated with the consumer will allow the consumer to access the data block. For example, the producer 402 can provide a challenge (e.g., the steps 416-418) to the consumer, the challenge associated with the request. The challenge can include a request to prove location of the consumer 404 where the context includes a geolocation. In some examples, the challenge can include the first challenge for proving geolocation, as mentioned above. This challenge can include a tuple containing identifiers associated with the consumer, the process, the data block, or others, as well as a token which is associated with the request. The consumer 404 may obtain a trusted third party certification (e.g., the steps 420-422) and one or more parameters for proving that the trusted third party certification is associated with the request from the consumer to access the data block. For example, the trusted third party 408 can provide the trusted third party certification which includes the response to the challenge, the token, a timestamp/nonce, or one or more other parameters for proving that the trusted third party certification is associated with the request from the consumer 404 to access the data block with the data block identifier specified in the request. The verification by the producer 402 may be subject to obtaining the response to the challenge, the response comprising at least the certification that the context associated with the consumer will allow the consumer to access the data block, as noted above.

At step 706, upon verifying that the context allows the consumer to access the data block, the process 700 can include transferring a data capsule, the data capsule comprising an encrypted version of the data block and a micro agent for monitoring access to the data block. For example, the producer 402 can transfer the data capsule 210 to the consumer 404 (e.g., using the data broker 406 as an intermediary), where the data capsule 210 can include an encrypted version of the data block 216 and the micro agent 212. The micro agent 212 can be configured for monitoring access to the data block 216. For example, the micro agent 212 can include a self-executable macro for maintaining a log of all read and write accesses to the data block 216. The micro agent 212 can be configured to control access to the data block 216 by one or more applications (e.g., the I/O applications 604) when the data block is received by the consumer, based on interacting with an operating system (e.g., the OS 606). In some examples, continuous geolocation assessment can be performed while transferring the data capsule, the continuous geolocation assessment for verifying the geolocation of the consumer 404 at two or more points in time during the transfer. Furthermore, in some examples, as previously described, additional or subsequent challenges can be implemented to provide verification of the geolocation at the destination before the data block can be decrypted at the destination.

Figure 8:
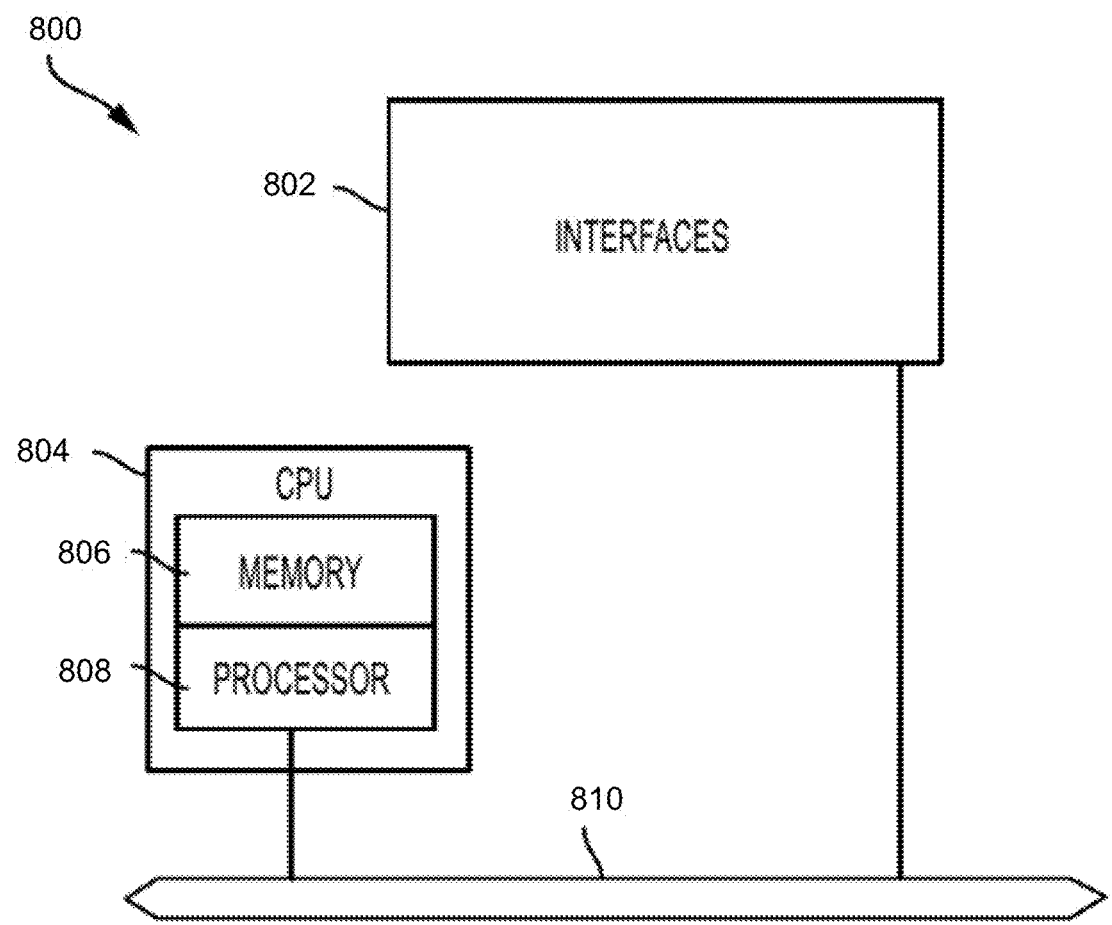
FIG. 8 illustrates a network device, in accordance with some examples.

FIG. 8 illustrates an example network device 800 suitable for implementing the aspects according to this disclosure. In some examples, the producer 202/402, the consumer 204/404, and/or any other device such as the data broker 406, the trusted third party 408, or others discussed in example systems may be implemented according to the configuration of the network device 800. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
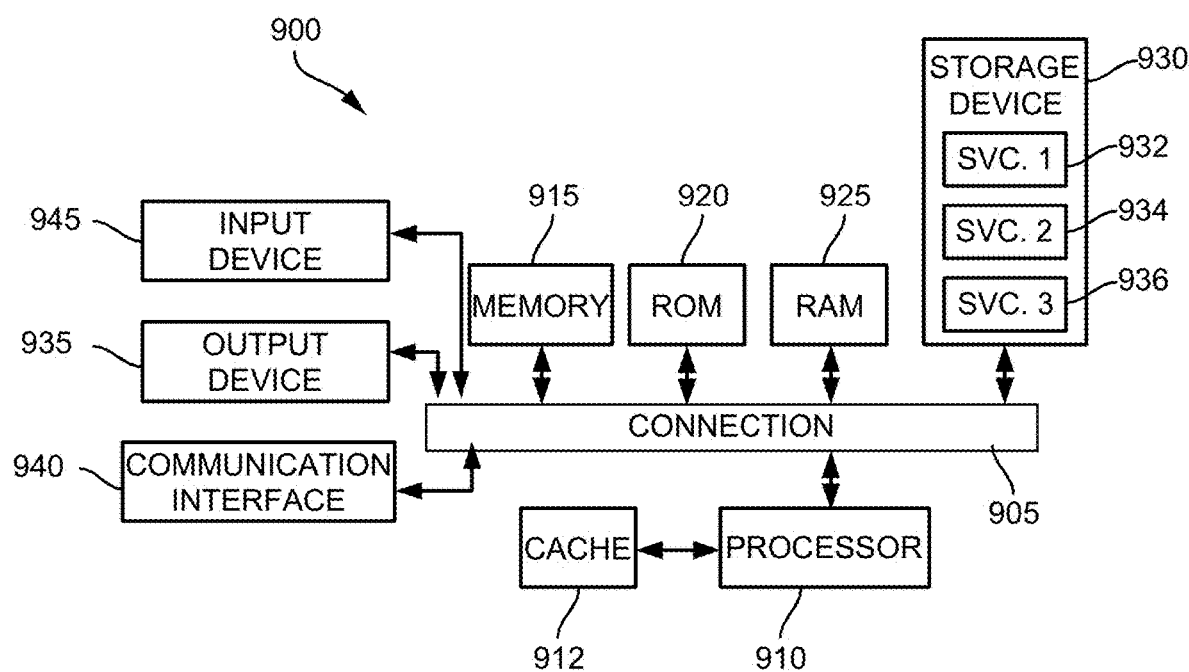
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method for controlling context-based access of data, the method comprising:
   receiving, at a producer, a request to access a data block from a consumer, wherein an encrypted version of the data block is included in a data capsule, the data capsule further including a self-executable micro agent for controlling access to the encrypted version of the data block based on a geolocation of the consumer;
   verifying, by the self-executable micro agent included in the data capsule, whether a geolocation context associated with the consumer will allow the consumer to access the data block based on providing the geolocation context to the self-executable micro agent included in the data capsule; and
   upon verifying, by the self-executable micro agent included in the data capsule, that the geolocation context will allow the consumer to access the data block, transferring the data capsule including the encrypted version of the data block and the self-executable micro agent, wherein the self-executable micro agent allows access to the data block based on verifying the geolocation context associated with the consumer.

2. The method of claim 1, wherein verifying whether a geolocation context associated with the consumer will allow the consumer to access the data block comprises:
   providing a challenge to the consumer, the challenge associated with the request; and
   obtaining a response to the challenge, the response comprising at least a certification that the geolocation context associated with the consumer will allow the consumer to access the data block.

3. The method of claim 2, wherein the certification comprises a trusted third party certification and one or more parameters for proving that the trusted third party certification is associated with the request from the consumer to access the data block.

4. The method of claim 1, further comprising:
   receiving the request from a data broker and transferring the data capsule to the data broker, the data broker configured as an intermediary between the producer and the consumer.

5. The method of claim 1, wherein the micro agent comprises a self-executable macro for maintaining a log of all read and write accesses to the data block.

6. The method of claim 1, wherein the micro agent is configured to control access to the data block by one or more applications when the data block is received by the consumer, based on interacting with an operating system.

7. The method of claim 1, wherein the data capsule further comprises a data block identifier associated with the data block, the data block identifier for identifying the data block.

8. The method of claim 1, wherein the geolocation context is a geolocation associated with the consumer.

9. The method of claim 8, further comprising:
performing continuous geolocation assessment while transferring the data capsule, the continuous geolocation assessment for verifying the geolocation of the consumer at two or more points in time during the transfer.

10. A system for controlling context-based access of data, the system comprising:
one or more processors; and
a non-transitory computer-readable storage medium containing instructions which, when executed on the one or more processors, cause the one or more processors to perform operations including:
receiving, at a producer, a request to access a data block from a consumer, wherein an encrypted version of the data block is included in a data capsule, the data capsule further including a self-executable micro agent for controlling access to the encrypted version of the data block based on a geolocation of the consumer;
verifying, by the self-executable micro agent included in the data capsule, whether a geolocation context associated with the consumer will allow the consumer to access the data block based on providing the geolocation context to the self-executable micro agent included in the data capsule; and
upon verifying, by the self-executable micro agent included in the data capsule, that the geolocation context will allow the consumer to access the data block, transferring the data capsule including the encrypted version of the data block and the self-executable micro agent, wherein the self-executable micro agent allows access to the data block based on verifying the geolocation context associated with the consumer.

11. The system of claim 10, wherein verifying whether a geolocation context associated with the consumer will allow the consumer to access the data block comprises:
providing a challenge to the consumer, the challenge associated with the request; and
obtaining a response to the challenge, the response comprising at least a certification that the geolocation context associated with the consumer will allow the consumer to access the data block.

12. The system of claim 11, wherein the certification comprises a trusted third party certification and one or more parameters for proving that the trusted third party certification is associated with the request from the consumer to access the data block.

13. The system of claim 10, wherein the operations further comprise:
receiving the request from a data broker and transferring the data capsule to the data broker, the data broker configured as an intermediary between the producer and the consumer.

14. The system of claim 10, wherein the micro agent comprises a self-executable macro for maintaining a log of all read and write accesses to the data block.

15. The system of claim 10, wherein the micro agent is configured to control access to the data block by one or more applications when the data block is received by the consumer, based on interacting with an operating system.

16. The system of claim 10, wherein the data capsule further comprises a data block identifier associated with the data block, the data block identifier for identifying the data block.

17. The system of claim 10, wherein the geolocation context is a geolocation associated with the consumer.

18. The system of claim 17, wherein the operations further comprise:
performing continuous geolocation assessment while transferring the data capsule, the continuous geolocation assessment for verifying the geolocation of the consumer at two or more points in time during the transfer.

19. A non-transitory machine-readable storage medium, including instructions configured to cause a data processing apparatus to perform operations for controlling context-based access of data, the operations including:
receiving, at a producer, a request to access a data block from a consumer, wherein an encrypted version of the data block is included in a data capsule, the data capsule further including a self-executable micro agent for controlling access to the encrypted version of the data block based on a geolocation of the consumer;
verifying, by the self-executable micro agent included in the data capsule, whether a geolocation context associated with the consumer will allow the consumer to access the data block based on providing the geolocation context to the self-executable micro agent included in the data capsule; and
upon verifying, by the self-executable micro agent included in the data capsule, that the geolocation context will allow the consumer to access the data block, transferring the data capsule including the encrypted version of the data block and the self-executable micro agent, wherein the self-executable micro agent allows access to the data block based on verifying the geolocation context associated with the consumer.

20. The non-transitory machine-readable storage medium of claim 19, wherein verifying whether a geolocation context associated with the consumer will allow the consumer to access the data block comprises:
providing a challenge to the consumer, the challenge associated with the request; and
obtaining a response to the challenge, the response comprising at least a certification that the geolocation context associated with the consumer will allow the consumer to access the data block.

* * * * *